May 18, 1937.  B. T. MORGAN  2,080,627
RUBBER CUSHIONED UNIVERSAL JOINT
Filed July 11, 1936
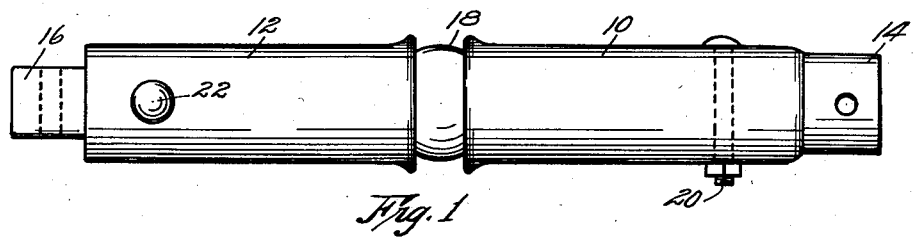
Fig. 1
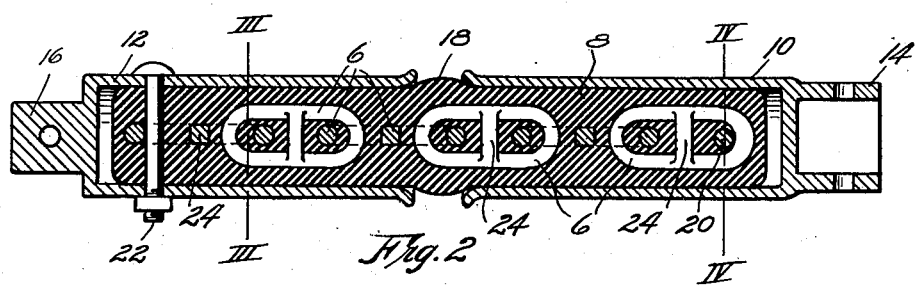
Fig. 2
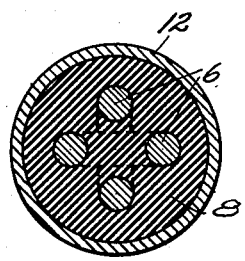
Fig. 3
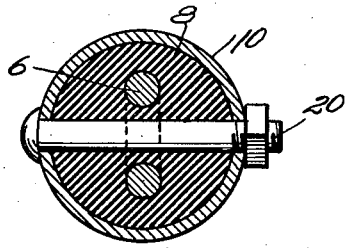
Fig. 4
Fig. 5
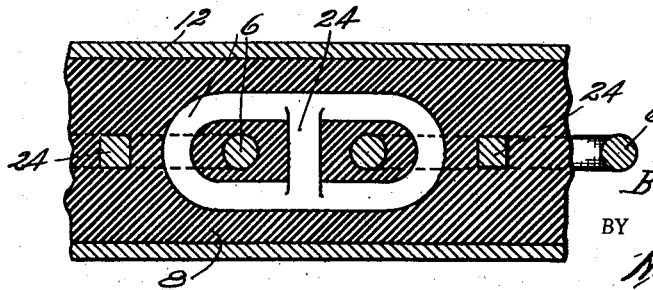
INVENTOR,
Benjamin T. Morgan.
BY
Harvey & Hamilton
ATTORNEYS.

Patented May 18, 1937

2,080,627

UNITED STATES PATENT OFFICE 2,080,627

RUBBER CUSHIONED UNIVERSAL JOINT

Benjamin T. Morgan, Kansas City, Mo.

Application July 11, 1936, Serial No. 90,147

8 Claims. (Cl. 64—11)

This invention relates to joint units of the universal type, and the primary object is to provide a rubber-cushioned member which may be utilized effectively wherever joints of such character are needed.

One of the important aims of this invention is the provision of a rubber-cushioned universal joint that comprises a combination of interlaced, rigid links embedded in resilient material, which maintains the links in spaced relation and provides therefor, yieldable structure for holding the same in place.

A yet further object of the invention is to provide a rubber-cushioned universal joint with a number of encasing elements disposed to permit longitudinal flexing, and having means for securing the unit in operative position.

Other objects of the invention will appear during the course of the following specification, referring to the accompanying drawing, wherein:

Figure 1 is a side view of a universal joint embodying this invention.

Fig. 2 is a longitudinal, central section through the universal joint.

Fig. 3 is an enlarged, cross sectional view through the joint, taken on line III—III of Fig. 2.

Fig. 4 is a similar cross sectional view, taken on line IV—IV of Fig. 2, and,

Fig. 5 is an enlarged, fragmentary, detailed, sectional view through a portion of the length of the joint, with parts broken away to reveal the links.

Heretofore mechanical means for establishing universal joints have not been successful in eliminating "slap" or "play" because of the absence of any resilient buffing material which could act upon the rigid parts comprising the joint. The prime feature in a joint unit embodying this invention is the inclusion of a body of resilient material that will overcome any tendency to jerk or slap, and the preferred manner of constructing this rubber-cushioned universal joint is as illustrated. The joint unit might be built into any mechanism where universal joints are needed, and a typical location of such a member is between the drive and driven shafts of an automobile.

The numeral 6 indicates a number of interlaced links making up a chain, that is embedded in a body 8 of resilient material, such as tough rubber molded into a form that will easily flex, and which may be conveniently encased in the opposed thimbles 10 and 12. Thimble 10 is formed as at 14 so that attachment may be made to any suitable mechanical unit, and, likewise, thimble 12 has a means of connection 16 integral therewith so that attachment might be made to another mechanical unit. The proximal ends of thimbles 10 and 12 are slightly spaced apart and flared outwardly, as shown in Figs. 1 and 2, so that when longitudinal flexing occurs, the edges of the thimbles at the ends will not dig into body 8. An enlarged portion 18 of body 8 is presented between the ends of thimbles 10 and 12 so that when flexing does occur, no diminution of thickness will create a tendency to draw together the two opposed thimbles.

Links 6 are embedded in a very particular manner and are secured to thimbles 10 and 12 by cross bolts 20 and 22 respectively. Each link 6 is held completely isolated from the adjoining link by the material in body 8 and alternate links lie in planes perpendicular to the intermediate links. This relation is definitely shown in Fig. 3, and as a result of such construction, torque exerted about the longitudinal axis of the unit will compress that portion of body 8 which lies between the interlaced portions of links 6. Thus buffing action is set up by the entire body because of its continuity and its resiliency permits twisting of the links when sufficient force is exerted, yet maintains the said links in a normal position, as shown and above set down.

As a further result of the links being completely isolated and held apart by the material in body 8, longitudinal flexing and extending is possible. Any pull exerted along the longitudinal axis of the unit will be transmitted from one thimble to the other through links 6 only after the resilient material of body 8 separating the said links has been compressed. Obviously, this compression will not occur quickly enough to create a sudden jolt and as soon as the force is released, the inherent resiliency of body 8 will slowly and gradually return the links to their normal position.

The distance between the links when they are initially molded into body 8 will govern to a large extent the cushioning action and the distance may be altered in direct proportion to the amount of force the unit is to withstand. Each link 6 is provided with a tie member 24, and the entire structure, when assembled as shown, may be handled as a unit and installed with ease.

It is understood that universal joints having characteristics other than those made apparent by this specification and the accompanying drawing might be made to embody the invention without departing from the spirit thereof, and while the preferred form of the invention has been disclosed, it is desired to be limited only by the scope of the appended claims:

Having thus described the invention, what is claimed as new and desired to be secured by Letters Patent is:

1. A joint unit of the character described comprising a body of resilient material; a series of links embedded in said material and maintained separated from each other thereby; and means at the ends of said body for securing the unit in operative position, every link in the series thereof being held spaced from the other links of the series by a portion of said body of resilient material.

2. A joint of the character described comprising a body of resilient material; a series of links embedded in said material and maintained separated from each other thereby; elements encasing the said body along lengths thereof at its ends respectively, each having a device for engaging the respective proximal links; and means formed by the encasing elements for securing the unit in operative position.

3. A joint of the character described comprising a body of resilient material; a series of links embedded in said material; elements encasing the said body along lengths thereof at its ends respectively; means formed by the encasing elements for securing the unit in operative position; and means securing together the encasing elements and body to prevent relative displacement, said securing means being in engagement with the series of links to transmit force thereto when the body of resilient material reaches its limit of resiliency.

4. A joint unit of the character described comprising a body of resilient material; a series of links embedded in said material; and means at the ends of said body for securing the unit in operative position, said links being interlaced and held in spaced relation by said resilient body.

5. A joint unit of the character described comprising a body of resilient material; a series of interlaced links embedded in said material with the individual links maintained in spaced-apart relation by said body; and a thimble encasing each end of the body respectively, the inner ends of the thimbles being in spaced-apart relation for the purpose specified.

6. A joint unit of the character described comprising a body of resilient material; a series of interlaced links embedded in said material with the individual links maintained in spaced-apart relation by said body; and a thimble encasing each end of the body respectively, the inner ends of the thimbles being in spaced-apart relation for the purpose specified, said body being bulged outwardly between the ends of said thimbles.

7. A joint unit of the character described comprising a body of resilient material; a series of interlaced links embedded in said material with the individual links maintained in spaced-apart relation by said body; and a thimble encasing each end of the body respectively, the inner ends of the thimbles being in spaced-apart relation for the purpose specified, said body being bulged outwardly between the ends of said thimbles, said thimbles having the inner ends thereof flared outwardly to permit flexing of the unit without destructive frictional engagement with said ends.

8. A joint unit of the character described comprising a body of resilient material; a chain having a series of links embedded in said material; and means at each end respectively of the body for securing the unit in operative position, alternate links of the chain being in planes perpendicular to the other links and all maintained in spaced relation by material of the body which forms a cushion as force is exerted on the chain tending to twist the same about its longitudinal axis.

BENJAMIN T. MORGAN.